United States Patent [19]
Abolins et al.

[11] Patent Number: 4,478,970
[45] Date of Patent: Oct. 23, 1984

[54] POLYPHENYLENE ETHER RESIN BLENDS REINFORCED WITH FINELY DIVIDED PARTICULATE CLAY OF NARROW SIZE DISTRIBUTION

[75] Inventors: Visvaldis Abolins, Delmar; Robert J. Axelrod, Glenmont; Peter H. Shu, Schenectady, all of N.Y.

[73] Assignee: General Electric Company, Pittsfield, Mass.

[21] Appl. No.: 564,479

[22] Filed: Dec. 21, 1983

[51] Int. Cl.$^3$ ............................................. C08K 5/53
[52] U.S. Cl. .................................... 524/125; 524/126; 524/140; 524/141; 524/445; 524/447; 524/611
[58] Field of Search ............... 524/125, 126, 140, 141, 524/611, 445, 447

[56] References Cited
U.S. PATENT DOCUMENTS 4,166,812  9/1979  Lee, Jr. .
4,317,761  3/1982  Abolins .
4,318,836  3/1982  Abolins .

Primary Examiner—Lewis T. Jacobs
Attorney, Agent, or Firm—Hedman, Gibson, Costigan & Hoare

[57] ABSTRACT

Blends of a polyphenylene ether resin, optionally containing an impact modifier, are filled with finely divided particulate clay which is characterized by a very narrow size distribution, 98 percent or more of the particles being less than 2 microns in diameter, and a very small particle size, with the particles having mean equivalent spherical diameter of from 0.2 to 0.4 microns. This particular clay filler provides rigidity and stiffness, as expected, but with better retention of other physical properties which are normally adversely affected by other mineral fillers, such as larger particle size clay and titanium dioxide. Adhesion between this clay and the polymer, which is already good, is further enhanced by pre-cleaning the clay particles to remove surface dirt, chemicals and salts.

18 Claims, No Drawings

POLYPHENYLENE ETHER RESIN BLENDS REINFORCED WITH FINELY DIVIDED PARTICULATE CLAY OF NARROW SIZE DISTRIBUTION

BACKGROUND OF THE INVENTION

The polyphenylene ether resins are a family of engineering thermoplastics known to be admixable with other polymeric materials, such as styrenic copolymeric impact modifiers, to form blends which can be molded into articles of various shapes and sizes. The polyphenylene ether resins and methods of their preparation are described in U.S. Pat. Nos. 3,306,874 and 3,306,875 (Hay), in U.S. Pat. Nos. 3,257,357 and 3,257,358 (Stamatoff), and elsewhere. Styrenic polymers suitable for admixture with the polyphenylene ether resins are described in U.S. Pat. No. 3,383,435 (Cizek), and elsewhere.

In general, mineral fillers, such as clay, titanium dioxide, silica, and the like, when incorporated into thermoplastic blends provide greater rigidity and stiffness in the molded or shaped article, as manifested by increases in the modulus, dimensional stability and heat distortion temperature. The use of various mineral fillers in polyphenylene ether resin compositions is described in the patent literature. For instance, mixtures of polyphenylene ether resin, rubber modified high impact polystyrene and aluminum silicate are disclosed in U.S. Pat. No. 4,166,812 (Lee, Jr.). The utility of small particle clay and of small particle titanium dioxide (in both cases, no greater than 0.6 micron in diameter) in plasticized compositions of a polyphenylene ether resin and an ABA block copolymer is disclosed by Abolins, in U.S. Pat. Nos. 4,317,761 and 4,318,836, respectively.

While the presence of mineral fillers confers the aforementioned benefits, in the typical case other important physical properties such as the impact strength, tensile elongation (ductility), optical properties and processability are adversely affected. These adverse effects are attributable to the fact that the polymer and mineral filler have poor compatibility and do not adhere well to one another. A result is that the amount of mineral filler which can be used is very limited if large increases in the melt viscosity are to be avoided, and even with smaller filler amounts the compositions must usually be processed at higher temperatures to compensate for the poorer melt flow.

INTRODUCTION TO THE INVENTION

It has now been discovered that certain grades of clay, having a very small particle size and a very narrow size distribution, as well as a clean surface, are more effective not only in providing the requisite rigidity and stiffness, but with smaller losses in other properties, in comparison with other mineral fillers such as titanium dioxide or larger particle clay. More specifically, this form of clay has the characteristics that 98 percent by weight or more of the particles are finer than 2 microns in diameter, the mean equivalent spherical diameter is in the range from 0.2 to 0.4 microns, and preferably the surface of the particles has been water washed three or more times, usually during manufacturing.

Clay fillers having these described features have now been found to be less detrimental than the more bulky fillers as a stress concentrator in the molded article. This is manifested by better properties when compared side by side with the other mineral filler types in blends which are otherwise identical, as shown in the accompanying examples.

DESCRIPTION OF THE INVENTION

In general, this invention comprises compositions which are admixtures of
  (a) a polyphenylene ether resin,
  (b) a plasticizer, and
  (c) a finely divided particulate clay filler having the following characteristics:
    (i) a mean equivalent spherical diameter of from 0.2 to 0.4 microns,
    (ii) 98 percent by weight or more are finer than 2 microns, and optionally
    (iii) the particles have been water washed three or more times.

The water washing of the clay particles is most conveniently carried out during the process of manufacture. Typically, the particles are suspended in water, followed by filtration, after which the procedure is repeated two or more times. The filtration is also useful to separate clay particles outside the prescribed 0.2–0.4 micron range and thus achieving a narrow size distribution, both of which are also essential features for this invention.

The washing treatment is believed to remove surface salts and chemicals from the clay particles deposited during manufacture and to result in enhanced adhesion, absorption and/or interpenetration between the clay particles and the polymer matrix in the composition.

The terminology "mean equivalent spherical diameter" is employed here in the conventional meaning, and in accordance with the explanation in the Handbook of Fillers and Reinforcement for Plastics, edited by H. J. Katz and J. V. Milewski, Van Nostrand Reinhold Co., New York (1978). The shapes of most filler materials are generally irregular. Kaolin clay, for instance, has the shape of hexagonal platelets. It is rare to find Kaolin clay particles that are true hexagonal platelets, however. The standard definition of the particle size in such cases is "equivalent spherical diameter" or "esd", or stated another way, the diameter of a sphere having the same volume as that of the particle.

The actual particle size distributions of the exemplified clay samples reported herein were determined using a Micrometrics Sedigraph 5000 D Particle Size Analyzer. The results can be expressed graphically as the cumulative mass percent vs. the equivalent spherical diameter in $\mu$m. The mean equivalent spherical diameter is the esd at 50% cumulative mass. A more detailed explanation of this technique is found in the article "Rapid, Automatic Particle Size Analysis in the Subsieve Range", by J. P. Oliver, G. K. Hickin and Clyde Orr, Jr., Powder Technology, 4 (1970/71), pp. 257–263, the disclosure of which is incorporated herein by reference.

Especially preferred for use in this invention are clay particles 98 percent by weight or more of which are finer than 1 micron.

Preferred polyphenylene ether resins are homopolymers or copolymers having units of the formula

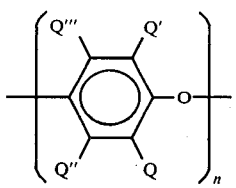

in which Q, Q', Q" and Q''' are, independently, selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

The polyphenylene ether resins are, in general, self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are described in the patent literature, including the Hay and Stamatoff patents mentioned above.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-diphenyl-1,4-phenylene) ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene) ether; poly(2-chloro-1,4-phenylene)ether; poly(2,6-dibromo-1,4-phenylene)ether; and the like.

Also included within the above formula are copolymers prepared from mixtures of phenolic monomers. Special mention is made of those based on the reaction of 2,6-dimethylphenol with other phenols, for example, with 2,3,6-trimethylphenol or 2-methyl-6-butylphenol, to produce the corresponding copolymer, for example, poly(2,6-dimethyl-co-2,3,6-trimethyl-1,4-phenylene)ether, poly(2,6dimethyl-co-2-methyl-6-butyl-1,4-phenylene)ether, and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene ether).

In general, the plasticizer, component (b), will be a high boiling liquid or low melting solid which has a softening effect on the polyphenylene ether resin and reduces its glass transition temperature. The plasticizer can be selected from among materials known to exert these effects on polymers generally and on polyphenylene ether resins in particular. Suitable types include linear aliphatic esters based on dibasic acids, such as adipates, azelates and sebacates, or on phophorous, such as phosphates; as well as cyclic esters, such as phthalates, terephthalates, benzoates and trimellitates.

Preferably, component (b) is an organic phosphate and especially an aromatic phosphate compound of the formula

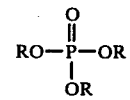

in which R may be the same or different and are selected from the group consisting of alkyl, cycloalkyl, aryl, alkyl substituted aryl, aryl substituted alkyl, halogen, halogen substituted aryl, or a combination of any of the foregoing.

Examples include cresyl diphenyl phosphate, 2-ethylhexyl diphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2- ethylhexyl phenyl and tri-2- ethylhexyl phosphate, tri(polychlorophenyl) phosphate or mixtures of any of the foregoing.

Preferably, at least one R is aryl. Especially preferred is triphenyl phosphate, as such or in one of its modified forms, such as isopropylated triphenyl phosphate.

Alternatively, the phosphate can be a di- or polyfunctional compound or polymer having the formula

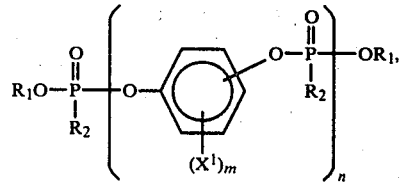

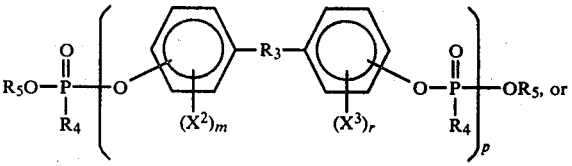

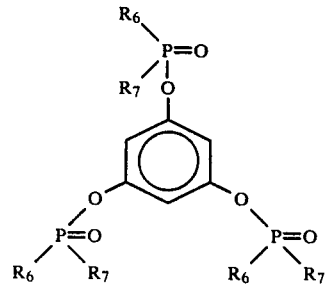

and mixtures thereof, wherein $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are from 1 to 30. These are described in British Pat. No. 2,043,083, incorporated herein by reference.

The presence of component (b) in the compositions lowers the glass transition temperature of the polyphenylene ether resin to an extent proportional to its amount and, in general, increases the resilience, mechanical flexibility and impact strength of moldings made from the compositions. Particular amounts will vary, depending on specific requirements. In the preferred embodiments, however, component (b) is included in a concentration of from about 5 to about 50 parts by weight, for each 100 parts of the total composition.

The particulate clay filler, component (c), is preferably included in amounts ranging from about 5 to about 50 parts by weight, for each 100 parts by the total composition weight.

The impact modifier, the presence of which in the compositions is optional, but preferred, may be a copolymer or terpolymer of an alkenyl aromatic compound, and especially a compound of the formula

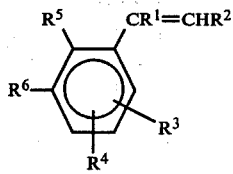

in which $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphtyl group.

Examples of compounds within the formula are styrene, as well as homologs and analogs thereof, such as alpha-methyl styrene, para-methyl styrene, bromostyrene, dibromostyrene, chlorostyrene, dichlorostyrene, vinyl xylene, divinylbenzene and vinyl naphthalene.

Preferred for use as the impact modifier are diblock-, triblock- or radial teleblock copolymers of styrene and a conjugated diene, for example, styrene-butadiene, styrene-isoprene, styrene-butadiene-styrene, styrene-isoprene-styrene, or the like, as well as hydrogenated derivatives thereof, for example, styrene-ethylene/butylene or styrene-ethylene/butylene-styrene.

These may be prepared using known processes, such as the sequential polymerization of the corresponding monomers in the presence of an organolithium catalyst, after which the polymer may be treated to reduce the aliphatic unsaturation by selective hydrogenation in the presence of, e.g., nickel (see, for instance, U.S. Patent No. 3,431,323).

Suitable impact modifiers are available commercially from Shell Oil Company, Chemicals Division, under the trade designations "Kraton" and "Kraton G".

The impact modifier, if employed, is added to the compositions in amounts effective to enhance the impact strength of the moldings, and generally, from about 2 to about 20 parts by weight, based on 100 parts of the total composition weight.

The compositions can also contain supplementary ingredients which may function to modify the chemical and physical properties. These may be selected from among conventional additives such as coloring agents (for example, dyes and pigments), stabilizers, antioxidants, melt flow enhancers, mold release agents, and so forth. Conventional amounts may be employed, ranging from about 1 to about 10 parts by weight, based on 100 parts of the total composition.

Preparation of the compositions may be accomplished by dry mixing or solution blending the ingredients, compounding the mixture on a screw extruder at a temperature of from 280 to 330° C., cooling and pelletizing the extrudate, and injection molding the pellets at a temperature of from 260 to 310° C. (55 to 85° C. mold temperature).

The compositions can be shaped into a wide variety of articles, and, in general, they can be used for the same purposes for which polyphenylene ether resin blends have heretofore been employed. Thus, a broad spectrum of manufactured objects is possible, ranging from personal care products such as hair driers made of plastic component parts and plastic housings for computers and office business machines, to interior consoles and exterior body trim in automobiles.

DESCRIPTION OF THE SPECIFIC EMBODIMENTS

The invention is illustrated in the following examples, which are presented to show preferred or best embodiments but are not intended in any way to be limiting.

In the Examples, the various forms of clay filler employed have the following respective characteristics:

| Type of Clay | Wt. % Finer than 2 microns | Wt. % Finer than 1 micron | Mean Equiv. Spherical Diam., microns |
|---|---|---|---|
| ASP-100 | 92 | 73 | 0.55 |
| HG | 94 | 90 | 0.29 |
| HG-90 | 97 | 94 | 0.29 |
| Fine Particle HG | 98.5 | 98 | 0.23 |
| Triple Filtered HG-90 | 100 | 98 | 0.32 |

ASP-100 is manufactured by Englehard Minerals and Chemicals Corporation. Each of the "HG" (Hydragloss) clays is a product of the Huber Chemical Company.

EXAMPLE 1

Compositions were prepared into test specimens by dry mixing 63.5 parts by weight of poly(2,6-dimethyl-1,4-phenylene ether)resin (PPO ®, General Electric Company), 4.0 parts by weight of styrene-ethylene/butylene-styrene block copolymer (Kraton G 1651, Shell Chemicals), 14.0 parts by weight of isopropylated triphenyl phosphate plasticizer-flame retardant agent (Kronitex-50, FMC Corp.), 1.0 part by weight of polyethylene, 0.5 part by weight of diphenyl decyl phosphite, 0.15 part by weight of zinc sulfide, 0.15 part by weight of zinc oxide and 17.5 parts by weight of clay (as noted in Table 1). The mixture was compounded by passage through a 28 mm. Werner-Pfleiderer twin screw extruder at a feed temperature of 300° F., and a die temperature of 590° F. (screw speed 300 rpm) under a vacuum equivalent to 10 inches of mercury. The extrudate was pelletized, and the pellets were injection molded on a 3-ounce Newbury injection molding machine, injection temperature 580° F., mold temperature 180° F. The results are shown in the Table.

weight of diphenyl decyl phosphite, 0.15 part by weight of zinc sulfide, 0.15 part by weight of zinc oxide and 17 parts by weight of clay filler (as noted in Table 2, below. The results are shown in the Table.

TABLE 2

| Clay Filler | Control (none) | ASP-100* | HG* | HG-90* | Fine Particle HG | Triple Washed and Filtered HG-90 |
|---|---|---|---|---|---|---|
| Properties |  |  |  |  |  |  |
| Notched Izod impact str., ft. lbs./in. of notch | 1.3 | 1.6 | 1.9 | 2.0 | 2.3 | 2.4 |
| Gardner impact str., in. lbs. | 375 | 234 | 232 | 232 | 238 | 258 |
| Heat distortion temp. under load at 264 psi, °F. | 280 | 288 | 291 | 287 | 289 | 297 |
| Injection channel flow length, in. | 13.9 | 12.1 | 12.0 | 12.5 | 11.7 | 11.1 |
| Surface gloss, at 45° | 58 | 41 | 46 | 46 | 50 | 40 |
| Tensile strength, psi | 10,640 | 1,400 | 12,000 | 12,000 | 11,800 | 12,600 |
| Tensile yield, psi | 13,400 | 13,600 | 13,500 | 13,700 | 13,600 | 13,500 |
| Tensile elongation, % | 62 | 36 | 47 | 44 | 38 | 55 |
| Flexural Modulus, psi | 350,600 | 517,100 | 509,700 | 496,700 | 489,600 | 508,000 |
| Flexural strength, psi | 16,600 | 18,000 | 17,800 | 17,700 | 17,600 | 18,000 |

*comparison experiment

TABLE 1

| CLAY FILLER | ASP-100* | HG* | HG-90* | Fine Particle HG | Triple Washed and Filtered HG-90 |
|---|---|---|---|---|---|
| Properties |  |  |  |  |  |
| Notched Izod impact str., ft. lbs./in. of notch | 1.6 | 2.4 | 2.4 | 3.2 | 3.6 |
| Gardner impact str., in.-lb. | 204 | 258 | 292 | 274 | 295 |
| Surface gloss, at 45° | 47 | 49 | 51 | 56 | 52 |
| Heat distortion temp. under load at 264 psi, in °F. | 252 | 252 | 251 | 252 | 245 |
| Injection channel flow length, in. | 14.8 | 14.9 | 14.5 | 14.8 | 15.6 |
| Melt viscosity, poises | 3300 | 3100 | 3300 | 3200 | 2950 |
| Tensile strength, psi | 9600 | 10,000 | 10,200 | 9900 | 10,100 |
| Tensile yield, psi | 11,500 | 11,700 | 11,600 | 11,800 | 11,600 |
| Tensile elongation, % | 33 | 34 | 41 | 42 | 45 |
| Flexural strength, psi | 17,900 | 18,800 | 17,800 | 17,500 | 17,200 |
| Flexural modulus, psi | 544,000 | 569,000 | 546,000 | 477,000 | 509,000 |

*comparison experiment

EXAMPLE 2

Using the same procedure described in Example 1, additional compositions were prepared for testing from 68 parts by weight of poly(2,6-dimethyl-1,4-phenylene ether)resin (PPO), 4 parts by weight of rubbery styrene-ethylene/butylene-styrene block copolymer (KG 651), 10 parts by weight of isopropylated triphenyl phosphate (K-50), 1.0 part by weight of polyethylene, 0.5 part by

EXAMPLE 3

The procedure was repeated to prepare molded compositions comprising 65 parts by weight of poly(2,6-dimethyl-1,4-phenylene ether)resin (PPO), 18.5 parts by weight of crystal polystyrene, 8.5 parts by weight of styrene-ethylene/butylene-styrene block copolymer (KG-1651), 0.15 part by weight of zinc sulfide, 0.15 part by weight of zinc oxide and 8 parts by weight of mineral filler (titanium dioxide or various clays, as shown in Table 3). The results are reported below.

TABLE 3

| Filler | Control (none) | TiO$_2$* | HG* | HG-90* | Fine Particle HG | Triple Washed and Filtered HG-90 |
|---|---|---|---|---|---|---|
| Properties |  |  |  |  |  |  |
| Notched Izod impact str., ft. lbs./in. of notch | 1.1 | 1.2 | 1.7 | 1.5 | 1.3 | 1.8 |
| Gardner impact str., in. lbs. | 188 | 112 | 197 | 179 | 221 | 215 |
| Heat distortion temp. under load at 264 psi, °F. | 306 | 313 | 321 | 310 | 310 | 317 |
| Injection channel flow | 14.5 | 13.5 | 11.8 | 12.6 | 13.0 | 12.2 |

TABLE 3-continued

| Filler | Control (none) | TiO₂* | HG* | HG-90* | Fine Particle HG | Triple Washed and Filtered HG-90 |
|---|---|---|---|---|---|---|
| length, in. | | | | | | |
| Surface gloss, at 45° | 63 | 60 | 53 | 58 | 58 | 57 |
| Tensile strength, psi | 10,100 | 10,200 | 10,900 | 10,900 | 10,800 | 10,900 |
| Tensile yield, psi | 12,900 | 13,000 | 13,300 | 13,400 | 13,500 | 13,400 |
| Tensile elongation, % | 43 | 29 | 32 | 32 | 21 | 21 |
| Flexural str., psi | 16,150 | 16,100 | 16,400 | 16,900 | 16,900 | 16,400 |
| Flexural modulus, psi | 390,700 | 364,700 | 387,300 | 413,600 | 415,900 | 404,900 |

*comparison experiment

All of the above mentioned patents are incorporated herein by reference.

Other modifications and variations of the invention are possible in the light of the present disclosure. For instance, instead of poly(2,6-dimethyl-1,4-phenylene ether)resin, a copolymer such as poly(2,6-dimethyl-co-2,3,6-trimethyl-1,4-phenylene ether) can be used. Triphenyl phosphate (a solid) can be substituted for K-50 (a liquid). In place of, or in addition to KG 1651, a nonhydrogenated counterpart such as styrene-butadiene-styrene block copolymer, or a radial teleblock copolymer of styrene and butadiene, either hydrogenated or non-hydrogenated (Phillips' Solprene ® ) materials) may be employed as an impact modifier. It is to be understood, therefore, that changes may be made in the specific embodiments shown which are still within the scope of the invention defined in the appended claims.

We claim:

1. A plasticized thermoplastic composition, comprising
    (a) a polyphenylene ether resin;
    (b) an effective amount of a plasticizer; and
    (c) a finely divided, particulate clay filler having the following characteristics:
        (i) a mean equivalent spherical diameter of from 0.2 to 0.4 microns, and
        (ii) 98 percent by weight or more are finer than 2 microns.

2. A composition according to claim 1, in which the clay particles of (c) have the further characteristic that
    (iii) they have been water washed three or more times to clean the surface 3. A composition according to claim 1, in which 98 percent by weight or more of the clay particles are finer than 1 micron.

4. A composition according to claim 1, in which the clay has been filtered three or more times to separate particles having a diameter outside the stated range.

5. A composition according to claim 1, in which the polyphenylene ether resin is a homopolymer or copolymer having units of the formula

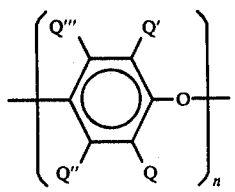

in which Q, Q', Q" and Q''' are, independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20.

6. A composition according to claim 5, in which the polyphenylene ether resin is poly(2,6-dimethyl-1,4-phenylene ether).

7. A composition according to claim 1, in which the plasticizer is an aromatic phosphate compound of the formula

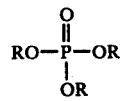

in which each R represents the same or a different radical selected independently from among alkyl, cycloalkyl, aryl, alkyl-substituted aryl, aryl-substituted alkyl, halogen and hydrogen, with at least one R always being aryl.

8. A composition according to claim 7, in which the aromatic plasticizer is triphenyl phosphate.

9. A composition according to claim 8, in which the triphenyl phosphate is isopropylated.

10. A composition according to claim 1, in which the plasticizer is a di- or polyfunctional compound or polymer of any of the following formulae

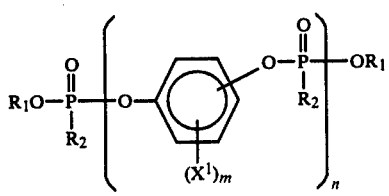

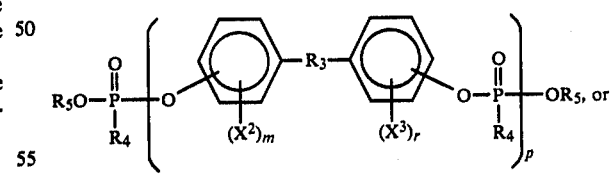

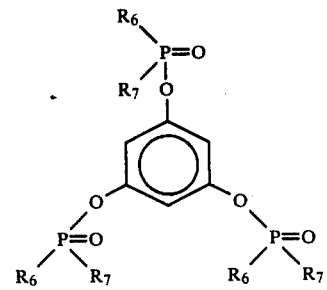

including mixtures thereof, wherein $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are from 1 to 30.

11. A composition according to claim 1, in which (b) is present in a plasticizing amount from about 5 to about 50 parts by weight, for every 100 parts of the total composition.

12. A composition according to claim 1, in which (c) is present in an amount sufficient to increase the notched Izod impact strength after molding relative to the same composition without (c) present.

13. A composition according to claim 12, in to about 50 parts by weight, for every 100 parts of the total composition.

14. A composition according to claim 1, which also includes an impact modifier for (a).

15. A composition according to claim 14, in which the impact modifier is an alkenyl aromatic co- or terpolymer.

16. A composition according to claim 15, in which the impact modifier is a copolymer of styrene and a diene, hydrogenated or nonhydrogenated.

17. A composition according to claim 16, in which the impact modifier is a hydrogenated styrene-butadiene-styrene block copolymer.

18. A composition according to claim 1, which includes one or more additives selected from among stabilizers, coloring agents, melt flow enhancers, and mold release agents.

* * * * *

UNITED STATES PATENT AND TRADEMARK OFFICE
CERTIFICATE OF CORRECTION

PATENT NO. : 4,478,970
DATED : October 23, 1984
INVENTOR(S) : Visvaldis Abolins, Robert J. Axelrod and Peter H. Shu It is certified that error appears in the above—identified patent and that said Letters Patent is hereby corrected as shown below:

In column 10, on line 34, after "aromatic" and before "plasticizer", the word --phosphate-- should be inserted;

In column 11, on line 14, after "in and before "to", the following language should be inserted:

--which (c) is present in an amount from about 5--.

Signed and Sealed this

Sixteenth Day of April 1985

[SEAL]

Attest:

DONALD J. QUIGG

Attesting Officer     Acting Commissioner of Patents and Trademarks